United States Patent [19]
Bianchini et al.

[11] 3,884,939
[45] May 20, 1975

[54] 1,1-DIPHENYL-1'-PHENYLTHIO-DI-PROPYLAMINE AND THE SALTS THEREOF

[76] Inventors: Pietro Bianchini, Via Sagittario, 58, Modena, Italy; Eupremio Vitale, Via Murri, 153; Guido Guerra, Via Castuglione, 34; Giustino Censoni, Via Mazzini, 44, all of Bologna, Italy

[22] Filed: Sept. 22, 1972
[21] Appl. No.: 291,273

Related U.S. Application Data
[63] Continuation-in-part of Ser. No. 270,807, July 11, 1972, abandoned.

[30] Foreign Application Priority Data
July 15, 1971  Italy .................................. 3476/71

[52] U.S. Cl. ...... 260/343.7; 260/501.21; 260/566 F; 260/570 R; 260/570.5 S; 260/599; 260/609 R; 260/649 R; 424/280; 424/316; 424/330
[51] Int. Cl. ............................................. C07d 5/12
[58] Field of Search ....... 424/330; 260/570, 501.21, 260/343.7

[56] References Cited
UNITED STATES PATENTS
3,565,955  2/1971  Ehrhart et al. ...................... 260/570

Primary Examiner—Robert V. Hines
Attorney, Agent, or Firm—Stevens, Davis, Miller & Mosher

[57] ABSTRACT

The invention relates to a new thio-alkylamine of the formula:

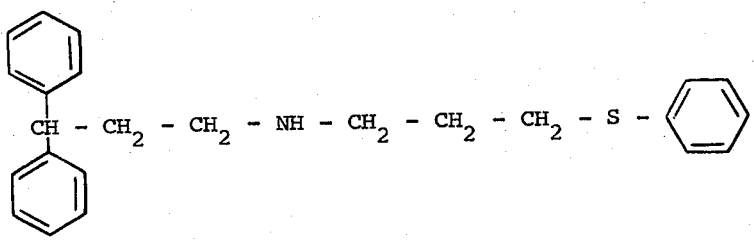

and its salts. the new thio-alkylamine possesses pharmacological properties, especially anti-ulcer activity. The invention also relates to a process for preparing the new thio-alkylamine and its pharmaceutical acceptable salts. The new thio-alkylamine is prepared by condensing a corresponding amine or a salt thereof with a corresponding halogenated compound or with a corresponding carbonyl compound followed by reduction. The salts of the new thio-alkylamine can also be obtained by reaction of the free base of the above formula with a pharmaceutically acceptable acid.

2 Claims, No Drawings

1,1-DIPHENYL-1'-PHENYLTHIO-DI-PROPYLAMINE AND THE SALTS THEREOF

This is a continuation-in-part of application Ser. No. 270,807, filed July 11, 1972, now abandoned.

The present invention relates to a new thio-alkylamine of the formula:

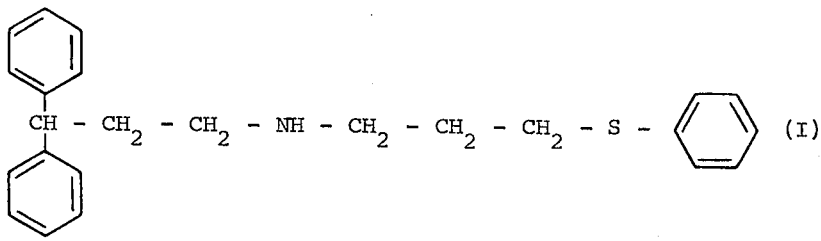

and its salts. The new thio-alkylamine of the invention possesses valuable pharmacological properties.

The present invention also relates to a process for the preparation of the above compound and of its pharmaceutically acceptable salts. The compound of the present invention, having the above formula (I), has proven to be remarkably active in the presence of the three main kinds of experimental ulcers, shows a weak spasmolytic activity and can be usefully employed in the human therapy.

The pharmaceutically acceptable salts of the compound with the above formula (I) include salts which are formed from acids which do not increase the intrinsic toxicity of the present compound. These acids can be as well as inorganic as organic.

As inorganic acids, the following ones can be used, for example, hydrochloric acid, hydrobromic acid, hydroiodic acid, phosphoric acid, metaphosphoric acid, pyrophosphoric acid, sulphuric acid and nitric acid.

As organic acids, which are pharmaceutically acceptable there can be used for example acetic acid, formic acid, propionic acid, tartaric acid, malic acid, citric acid or ascorbic acid.

The compound of the above formula (I) is prepared according to the present invention by condensing an amine of the formula:

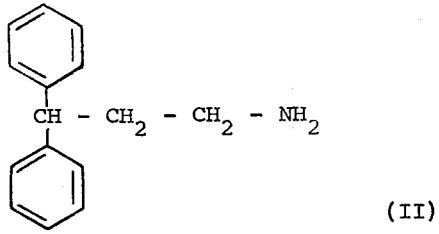

or a salt thereof with an halogenated compound of the formula:

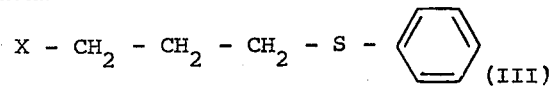

or by condensing an amine of the formula:

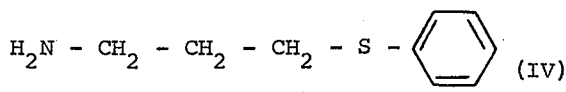

or a salt thereof with a halogenated compound of the formula:

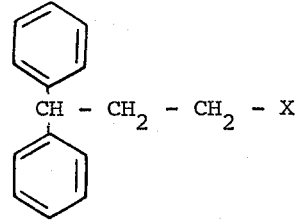

wherein X represents a halogen selected from chlorine, bromine and iodine. According to still another method of the present invention the compound of formula (I) can be prepared by condensing an amine of formula (II) with a carbonyl compound of the formula:

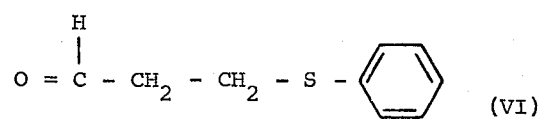

and reducing the condensation product to the compound (I).

The condensation of compounds (II) and (III) and of compounds (IV) and (V) is carried out a. by addition of the amine of formula (II) to the halogen compound of formula (III) at a temperature from 30° to 100°C., over a period of 3 to 6 hours, preferably in solution and under an inert atmosphere, or, b. by addition of the amine of formula (IV) to the halogen compound of formula (V) at a temperature from 30° to 100°C. over a period of 3 to 6 hours, preferably in solution and under an inert atmosphere.

Both the reactions (a) and (b) are carried out in the presence of an acid binding agent which will remove the hydrohalic acid as it is formed.

After completing the reaction, the reaction mixture is kept at a temperature from 30° to 100°C. over a period from 3 to 6 hours, and the reaction mixture is then allowed to stand for about 12 hours at room temperature.

After separating off the precipitate the compound of the invention is recovered from the filtrate as the free base by conventional techniques, such as concentration to a small volume, dissolution of the residue in chloroform, treatment with an acid, washing with water and making alkaline with ammonium hydroxide.

The crude product is generally obtained as a thick oil which solidifies on addition of organic solvents; the crude solid can be purified by crystallization.

As already mentioned, the above condensation reaction is preferably carried out in solvents such as aliphatic alcohols, aliphatic or aromatic ethers, aliphatic or aromatic hydrocarbons e.g. methanol, ethanol, propanol, ethyleneglycol, ethyleneglycol monoalkylethers, ethyleneglycol dialkylethers, anisole, ligroin, benzene and toluene.

Suitable basic agents which will remove the hydrohalic acid as it is formed at the condensation reaction include for example collidine, pyridine, N,N-dimethylaniline, N,N-diethylaniline, triethylamine and quinoline.

The pharmaceutically acceptable salts of the compound of formula (I) can be obtained by salification in solvents in which the free base is soluble, by reaction with an equivalent quantity of acid or by dissolving gradually the free base in a solution of the acid.

The invention is illustrated by the following Example.

EXAMPLE 120 g of hot 3-thiophenyl-1-bromo-propane were slowly added to a solution of 110 g of 3.3-diphenyl propylamine in isopropanol and 150 ml of triethylamine, under a stream of nitrogen.

The mixture was then refluxed for 5 hours and allowed to stand for 12 hours at room temperature.

The precipitated triethylamine hydrobromide was filtered off and the filtrate was concentrated. The oily residue was dissolved in chloroform and the solution was then saturated with gaseous hydrogen chloride and afterwards several times washed with warm water. The solution was dried over anhydrous sodium sulphate whereafter the solvent was evaporated.

The oily residue became solid on addition of a mixture 1:1 (v/v) of isopropanol and ether, whereafter the product was crystallized from isopropanol.

50 g of product were obtained, having a melting point from 115° to 116°C.

Analysis:

|  | C% | H% | N% |
|---|---|---|---|
| Calculated for $C_{24}H_{28}N\ Cl\ S$ | 72,42 | 7,09 | 3,51 |
| Found | 72,73 | 7,25 | 3,63 |

On the above prepared compound have been conducted the following studies of toxicology:

1 — Acute toxicity in the mouse and in the rat
2 — Subacute toxicity in the rat (28 days)
3 — Chronic toxicity in the rate (13 weeks)
4 — Chronic toxicity in the rat and in mini-pig (26 weeks)
5 — Teratology in rats and in rabbits 1 — Acute toxicity in the mouse and in the rat.

In the table below are shown the $DL_{50}$ values of the substance following a single administration through endovenous, endoperitoneum, subcutaneous and oral way.

| WAY | (°) $DL_{50}$ (mg/Kg) | | | |
|---|---|---|---|---|
|  | SEX | MOUSE (Swiss) | SEX | RAT (Wistar) |
| i.v. | M | 17,15 (16,59 – 17,76) | F | 19,70 (19,16 – 20,25) |
| i.p. | M | 39,40 (24,38 – 63,54) | F | 59,72 (38,52 – 92,57) |
| s.c. | M | >1000 | F | >1000 |
| p.o. | M | >1000 | F | >1000 |

(°) Weil & Thompson method (confidence interval $P \leq 0,05$)

2 — Subacute toxicity test in the rat.

| Duration | : 28 days |
|---|---|
| Animal | : Wistar rats (Morini) of both sexes |
| Dose | : 50 mg/Kg s.c. |
|  | 200 mg/Kg os |

Remarks:
— Signs
— Mortality
— Food consumption
— Bodyweight change
— Urine analysis
— Haematology
— Blood Chemistry
— Liver Chemistry
— Gross pathology and organ weight analysis
— Histology Results:
With both tested doses no significant variations appeared in respect of the animals used for the control.

3 — Prolonged toxicity test in the rat.

| Duration | : 13 weeks |
|---|---|
| Animals | : Wistar rats (Morini) of both sexes |
| Dose | : 150 mg/Kg os |

Same tests as for subacute toxicity.

In no cases have there been significant changes in respect of the animals used for the control.

4 — Prolonged toxicity test in the rat and in the mini-pig.

| Duration | : 26 weeks |
|---|---|
| Animals | : Wistar rats (Morini) of both sexes |
| Doses | : 25-75 - 150 mg/Kg os in the rat |
|  | 500 mg/os in the mini-pig |

Same tests as for subacute toxicity.

In no cases have there been significant changes in respect of the animals used for the control.

5 — Teratology in the rat and in the rabbit.

Foetal toxicity in the rat: the compound in question has been administered orally in the dose of 100 mg/Kg for 28 days.

In both tests have taken into consideration the following parameters:

— number of embryonic implantations and their distribution in the uterine horn
— number of riabsorptions
— number of leaving foetuses
— number of dead foetuses
— incidence, type and number of malformations
— foetuses weight
— longitudinal histological sections of the foetuses "in toto"
— scheletons of foetuses (obtained through clearing with alkalies and dyeing with Alizarin S)
— thigh-bones length and distribution in frequency classes The administration of the compound in exam did not modify the parameters taken into consideration in any way.

To examine the pharmacodynamic properties of the above prepared compound, the following tests have been carried out:

1 — Tests in vitro
 a. antispastic acitivity
 b. binding receptor-drug
2 — Anti-ulcer activity
 — Restrain ulcer
 — Shay ulcer
 — Reserpin ulcer
 — Prednisolon ulcer
 — Istamin ulcer
 — Serotonin ulcer
 — Indometacin ulcer
 — Glucose ulcer
3 — Analgesic & Anesthetic activity
4 — Other pharmacological activities 1 — Tests in vitro a. Anti-spastic activity:

It has been tested on sections of isolated organs of rats and guinea-pigs, in comparison with histamine, acetylcholine, serotonin, brandykinine, BaCl₂ and oxytocyne.

In the following table are shown the percentage inhibitions and relevant $ED_{50}$:

| TESTS | $10^{-4}$ | $10^{-5}$ | $10^{-6}$ | $ED_{50}$ |
|---|---|---|---|---|
| Ach. | 68.0 | 84.0 | 22.0 | $2\ 10^{-5}$ |
| H | 71.5 | 36.9 | 28.3 | $4\ 10^{-5}$ |
| BaCl₂ | 76.7 | 22.5 | 13.0 | $3\ 10^{-5}$ |
| BK | 69.0 | 17.0 | — | $3\ 10^{-5}$ |
| 5 HT | inhibition in function of the contact time | | | |
| OXIT | contractions increase | | | | b. Binding receptor-drug:

Duration of occupation time of receptor compartments by the compound has been determined measuring the length of anti-serotoninic action in vitro.

2 — Anti-ulcer activity

Such activity, evaluated through tests by different mechanism of action, is resumed in the following table:

| TEST | Dose mg/Kg | WAY | INHIBITION % |
|---|---|---|---|
| Restrain ulcer | 5 | os | 51 |
|  | 10 | '' | 58 |
|  | 20 | '' | 63 |
| Shay ulcer | 10 | s.c. | 45 |
|  | 20 | '' | 50 |
| Reserpin ulcer | 20 | S.c. | 48 |
| Prednisolon ulcer | 10 | i.m. | 75 |
| Histamin ulcer | 50 | os | 63 |
|  | 100 | '' | 92 |
|  | 10 | s.c. | 82 |
|  | 20 | '' | 92 |
| Serotonin ulcer | 10 | s.c. | 75 |
|  | 50 | os | 72.5 |
| Indometacin ulcer | 25 | os | 60 |
|  | 50 | '' | 73 |
|  | 125 | '' | 76 |
|  | 250 | '' | 88 |
| Glucose ulcer | 50 | os | 64 |

3 — Analgesic and Anesthetic activity

The analgesic activity has been evaluated through the following tests:
— contractions induced by chemical substances
— clip in rat's tail On both tests the product has resulted inactive. The anesthetic activity has been studied through the following tests:
— annulment of corneous palpebral reflex in the rabbit
— infiltration anesthesia in guinea-pig.

In the first test, the compound of the example has resulted far more active than lydocaine, used as comparative drug, at the same concentration (1%).

In the second test of the example activity resulted equal to that of lydocaine (0.1%).

4 — Other pharmacological activities
— Dextran edema

At 10 mg/Kg and 50 mg/Kg doses administered respectively s.c. and orally, the compound inhibits in the range of 50% the forming of edema in rat's paw.

— Intestinal peristalsis

No changes of motility and intestinal transit.

What we claim is:

1. Compound of the formula:

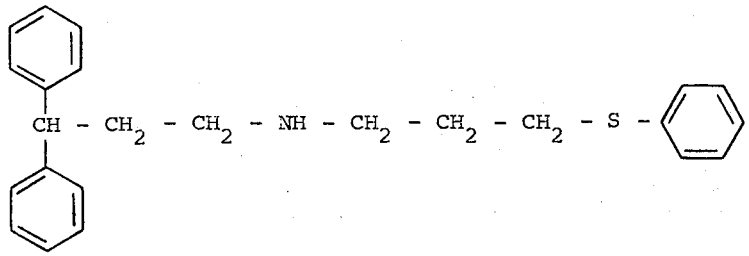

and its pharmaceutically acceptable salts.

2. Pharmaceutically acceptable salts of the compound according to claim 1 selected from hydrochloric acid, hydrobromic acid, hydroiodic acid, phosphoric acid, metaphosphoric acid, pyrophosphoric acid, sulphuric acid, nitric acid, acetic acid, formic acid, propanoic acid, tartaric acid, malic acid, citric acid or ascorbic acid.

* * * * *